April 12, 1966     S. C. BAKER     3,245,398

FIRE GRATE FOR BARBECUE GRILLS

Filed Oct. 7, 1963

INVENTOR.
Stephen C. Baker
BY
Dale A. Winnie
ATTORNEY

United States Patent Office 3,245,398
Patented Apr. 12, 1966

3,245,398
FIRE GRATE FOR BARBECUE GRILLS
Stephen C. Baker, Detroit, Mich., assignor to Su Ev, Inc., Birmingham, Mich., a corporation of Michigan
Filed Oct. 7, 1963, Ser. No. 314,421
2 Claims. (Cl. 126—152)

This invention relates to fire grates for barbecue grills and the like, and more particularly to a means of retaining hot coals disposed for good burning and even distribution of heat.

Those who use outdoor barbecue grills are well acquainted with the problems of starting and maintaining a good fire in a grill to assure proper cooking of the meat or whatever is to be prepared.

Not infrequently, a grill has been left out in the rain or caught in a quick shower and the bottom of the grill is damp and wet. Further, the briquets or other fuel lie within the protection of the side walls of the grill and on the bottom where good circulation for the best burning is hard to maintain. The fuel is normally collected together and piled high to hold some of the coals up for better burning circulation and must later be spread out under the grill work on which the meat or other food is laid.

All of this, and more which could be said, merely emphasizes the present problems which this invention seeks to avoid.

It is an object of this invention to provide a fire grate for use in barbecue grills and the like for holding and positioning the burning coals up off the bottom of the grills.

It is an object of this invention to provide a simple and inexpensive means for so positioning hot coals in barbecue grills.

It is also an object of this invention to provide a simple and expedient means for orienting and positioning hot coals on a fire grate for better burning and more even distribtuion of the heat emanating therefrom.

To be more specific, it is an object of this invention to provide a fire grate for barbecue grills and the like which is made of expanded metal or like screen material. The fire grate may be provided in precut circular form for portable type round grills or in rectangular sheets that may be cut to size or otherwise adapted for use in a fireplace grill.

Further refinements of this invention include forming the fire grate screens to include ridges or pockets enabling the burning coals disposed thereon to be placed for better and more even burning as well as for obtaining an even and more uniform bed of hot coals over which better cooking is possible.

These and other objects and advantages to be gained in the practice of this invention will be better understood and appreciated upon a reading of the following specification in regard to a preferred embodiment of the invention and having reference to the accompanying drawings wherein.

Figure 1:
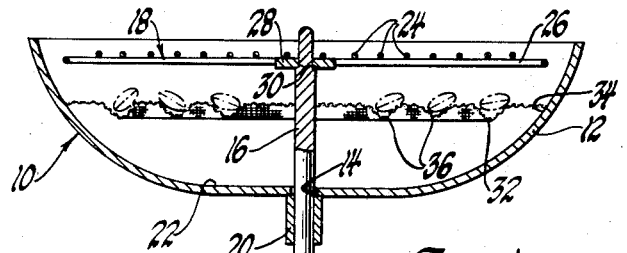
FIGURE 1 is a cross-sectional side view of a portable barbecue grill having the fire grate of this invention used therewith.

The outdoor barbecue grill 10 of FIGURE 1 is of the portable type including a fire retaining bowl 12 having an opening 14 in the bottom through which a vertically adjustable member 16 extends and on which is disposed a wire form member 18 to hold whatever is to be cooked on the grill. A guide member 20 is secured to the bottom of the bowl 12 to guide the adjustable member or pin 16 which supports the wire form member 18.

The means of raising and lowering the adjustable pin member 16 are not significant to this invention and have not been shown. However, it will be appreciated that such means are located outside the fire bowl 12 and in turn cause the wire form grill member 18 to be raised and lowered relative to the bottom 22 of the bowl which serves as the hearth on which the hot coals are normally disposed.

The wire form grill member 18 includes concentrically disposed wire rod members 24 tied together by radial rod members 26 in the conventional manner and with a hub 28 that rests on a shoulder 30 formed on the vertically adjustable pin 16.

Heretofore, hot burning coals have been disposed in the bottom of the fire bowl 12 directly on the bottom wall or hearth 22. For longer serviceable life of the fire bowl 12 it is normally recommended that sand or loose gravel be provided in the bottom thereof as a form of insulation. However, such material provides a poor base for a fire when it is damp and is seldom used.

In the present instance, a fire grate 32 is provided in the fire bowl 12 and is engaged with the side walls 34 of the bowl so that it is spaced over the bottom wall or hearth 22 and below the wire form cooking grill member 18.

The fire grate 32 is preferably formed from a sheet of expanded metal and has sufficient planar rigidity to be self-supporting between its ends. In those instances in which support is derived from its ends, it is preferable to have the metal forming the screen expanded laterally so that there is greater longitudinal stability. However, when the fire grate is circular or otherwise formed or provided to include side support as well as end support this is of no great consequence.

Figure 2:
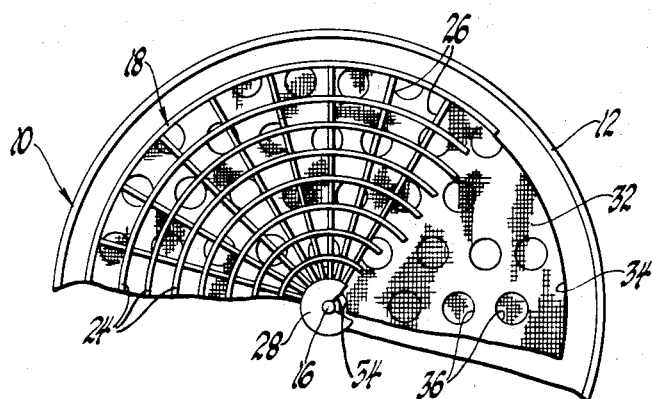
FIGURE 2 is a plan view of a fragmentary section of the grill of FIGURE 1 with parts broken away to better show the fire grate of this invention.

Referring to FIGURES 1 and 2, it will be appreciated that the fire grate 32 is formed to a circular shape for use in the circular fire bowl 12. It includes a central opening 34 which fits over the vertically adjustable pin 16 and has its peripheral edge engaged to the side walls 34 of the bowl as previously mentioned. The peripheral edge of the fire grate 32 is preferably left as cut, with relatively but not dangerously sharp grill work ends for better gripping engagement with the fire bowl side walls.

In the circular form of the fire grate 32 a plurality of pocket-like depressions 36 are formed therein to provide upwardly open concavities in which charcoal briquets and the like may be disposed and retained while burning. These depressions may be circumferentially provided about the pin opening 34 at the center of the grate, and staggered for closer alignment, or they may be provided in linear staggered alignment in the sheet from which the grate is formed. The significant factor is that they provide means of positively receiving and retaining hot coals so that the fire bed is evenly distributed under the cooking grill 18 and an even heat is provided therefrom.

Figure 3:
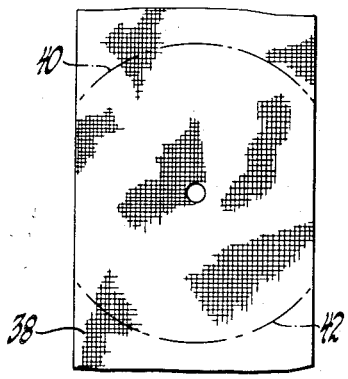
FIGURE 3 is a plan view of a fire grate screen for use in practicing this invention.

FIGURE 3 shows that a rectangular sheet 38 of the expanded metal may be provided to consumers with instructions to cut the ends, as at dotted lines 40 and 42, to arcuate shape and such as will fit into any size circular grill. This avoids the necessity of providing the end product in different sizes. It will be appreciated, while not shown, the pocket depressions 36 or the like would be preformed in the rectangular sheet 38.

Figure 4:
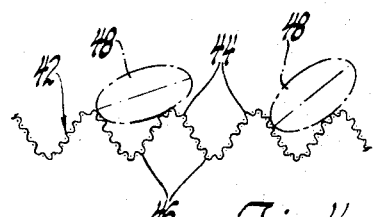
FIGURE 4 is a cross-sectional view of a modified form of the fire grate envisioned by this invention.

Referring to FIGURE 4, another variation within the teaching of this invention is to have the fire grate member, here identified as 42, formed to include ridges 44 and valleys 46 by corrugating the grate. This will also provide greater rigidity for the grate. The burning coals 48 are shown as disposed in the depressions or valleys 46 of the corrugated grate 42 and held in relative set relation so that the advantages aforementioned are readily attained.

Figure 5:
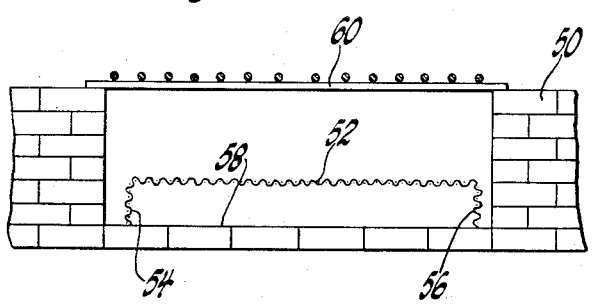
FIGURE 5 is a front view of another modified form of the fire grate envisioned by this invention shown in an outdoor fireplace grill.

FIGURE 5 shows an outdoor fireplace 50 in which a fire grate 52 may be disposed. The fire grate 52 is formed to include ends 54 and 56 which serve as supports and hold the hot coal receptive intermediate part spaced therebetween the hearth 58 and cooking grill 60.

It will be appreciated that having the fire grate made of expanded metal provides a grate which has the turned edges of the metal receptive of the hot coals rather than the side faces thereof. This enables a thinner metal to be used without concern for burn-out problems, provides a grate having a rough frictional surface which will of itself hold hot coals positioned, and affords a grill work inclusive of what might be considered heat dissipating fins in the way the metal is formed sideways with its edges disposed laterally.

It will also be appreciated that the expanded metal fire grates of this invention may be laid directly on a hearth and that many of the aforementioned advantages are still obtained. For example, the expanded metal itself will hold the hot coals off the hearth and enable circulation thereunder, and any depressions or pockets formed therein will hold the hot coals still further elevated and susceptible to a circulation of air thereunder for better burning.

Should any wood chips or noncombustible material be disposed on the screen when the cooking is done and the fire has burnt out, it is simple to remove the grate and dump the debris.

If desired, metal foil may be provided in the bottom of the grill to catch drippings and the like, as is conventionally known. This will also catch the ashes and enable the grill to be kept even more clean.

Without further discussion it should be obvious that numerous other variations, modifications and combinations are conceivable and within the scope of this invention.

Although a preferred embodiment and several variations have been specifically shown and described in detail herein, it will be appreciated that this has been done to illustrate the scope of the present invention and without intent to unnecessarily limit the invention thereto in any regard. Accordingly, such improvements, modifications and alterations as come to mind and are within the spirit of this invention and not specifically excluded by the language of the hereinafter appended claims are to be considered as inclusive thereunder.

I claim:

1. A fire grate for outdoor portable barbecue grills which include a fire bowl for building a fire therein and a grill for receiving food to be cooked in space relation over the fire in the fire bowl, said grate comprising;
    an expanded metal member formed to provide a screen for receiving and supporting fire coals thereon and for being received and supported between said fire bowl and said food cooking grill,
    said screen having a surface area formed to include a plurality of depressed areas for the reception of fire coals therein and for the predetermined spacial disposition of said coals in filling said depressed areas to provide relative control of the food cooking heat emanating therefrom and more even distribution of the heat in the consumption of said coals.

2. The fire grate of claim 1, said depressed areas including individual pockets receptive of individual fire coal at least partially therewithin and in spaced relation to all other fire coal receptive pockets.

References Cited by the Examiner

UNITED STATES PATENTS

| | | | |
|---|---|---|---|
| 1,497,490 | 6/1924 | Dullman | 126—152 |
| 2,190,139 | 2/1940 | Stockell | 126—25 |
| 2,597,477 | 5/1952 | Haislip | 126—25 |
| 2,630,062 | 3/1953 | Litt | 99—440 X |
| 2,985,164 | 5/1961 | Imoto | 126—25 |

FOREIGN PATENTS 2,482  3/1878  Germany.

FREDERICK L. MATTESON, JR., *Primary Examiner.*

JAMES W. WESTHAVER, *Examiner.*